(No Model.) 12 Sheets—Sheet 1.

L. P. SHERMAN.
MACHINE FOR DRAWING IN WARP THREADS.

No. 355,221. Patented Dec. 28, 1886.

Witnesses:
David S. Williams
Alex. Barkoff

Inventor:
Lewis P. Sherman
by his Attorneys
Howson & Sons (No Model.) 12 Sheets—Sheet 2.
L. P. SHERMAN.
MACHINE FOR DRAWING IN WARP THREADS.
No. 355,221. Patented Dec. 28, 1886.

FIG. 2.

Witnesses:
David S. Williams.
Alex. Barkoff

Inventor:
Lewis P. Sherman
by his Attorneys
Howson & Sons (No Model.)  12 Sheets—Sheet 3.

L. P. SHERMAN.
MACHINE FOR DRAWING IN WARP THREADS.

No. 355,221.  Patented Dec. 28, 1886.

Witnesses:
David S. Williams,
Alex. Barkoff

Inventor:
Lewis P. Sherman
by his Attorneys:
Howson & Sons

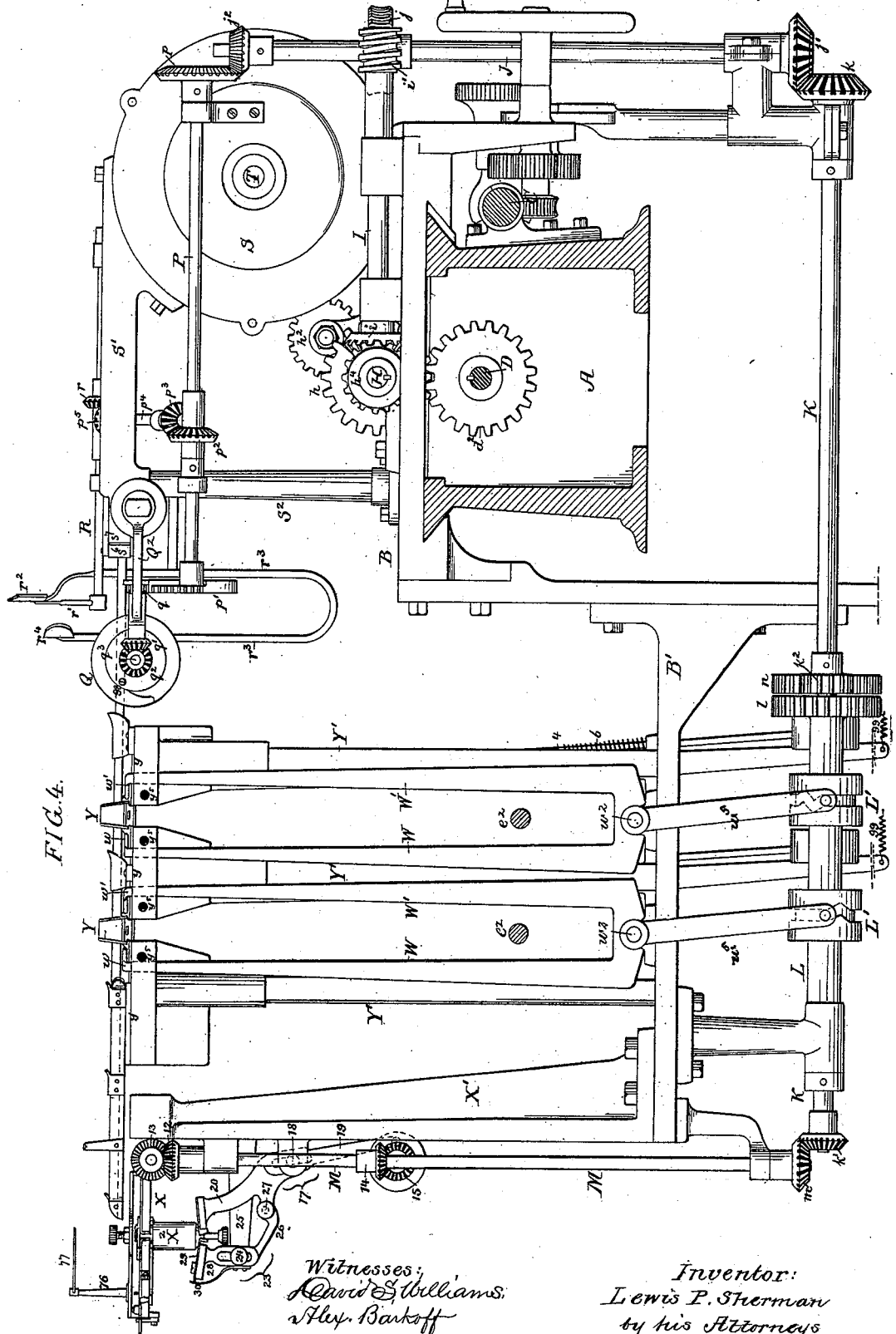

(No Model.) 12 Sheets—Sheet 5.
L. P. SHERMAN.
MACHINE FOR DRAWING IN WARP THREADS.
No. 355,221. Patented Dec. 28, 1886.
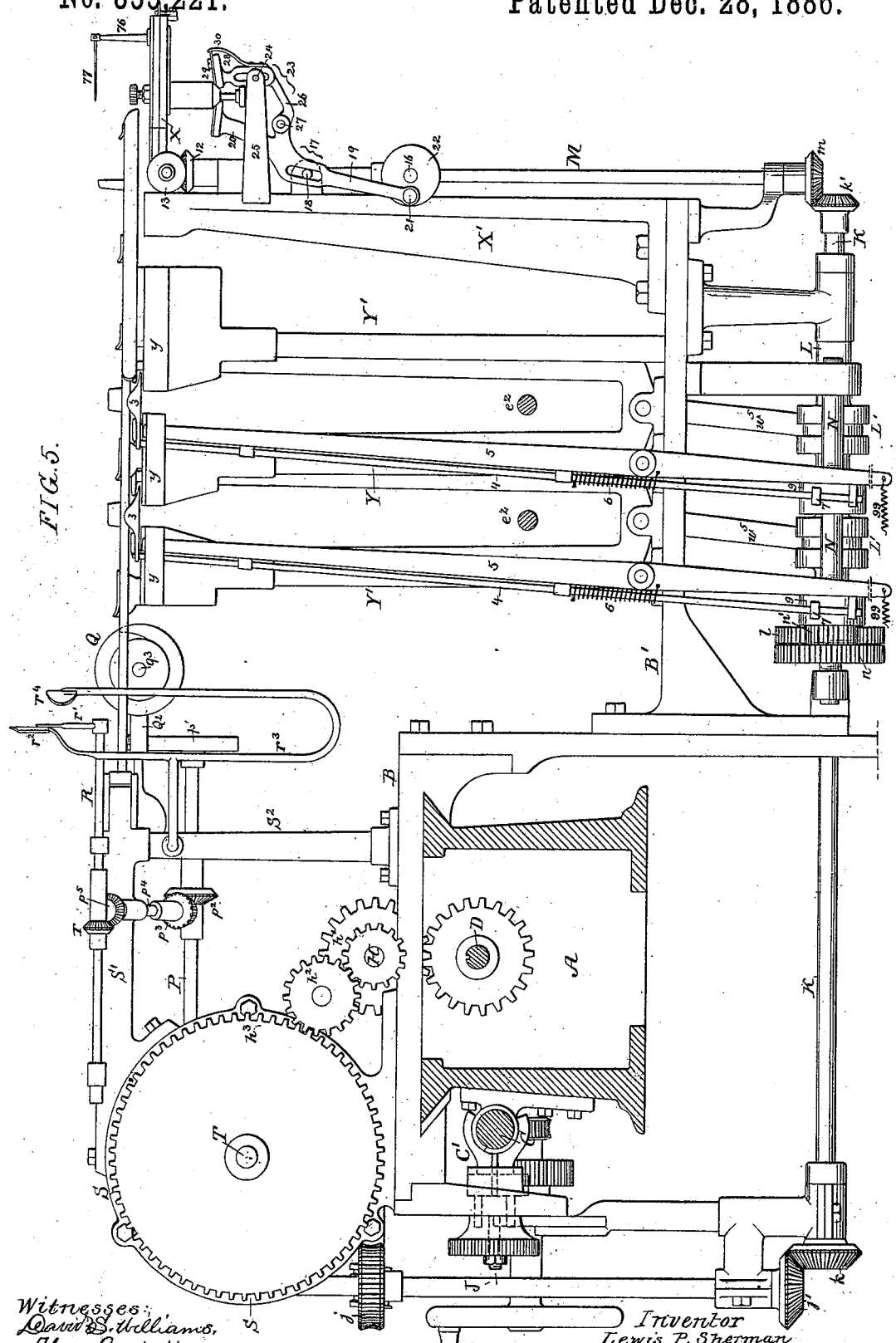
Witnesses:
Davis S. Williams
Alex Barkoff
Inventor
Lewis P. Sherman
by his Attorneys
Howson Sons

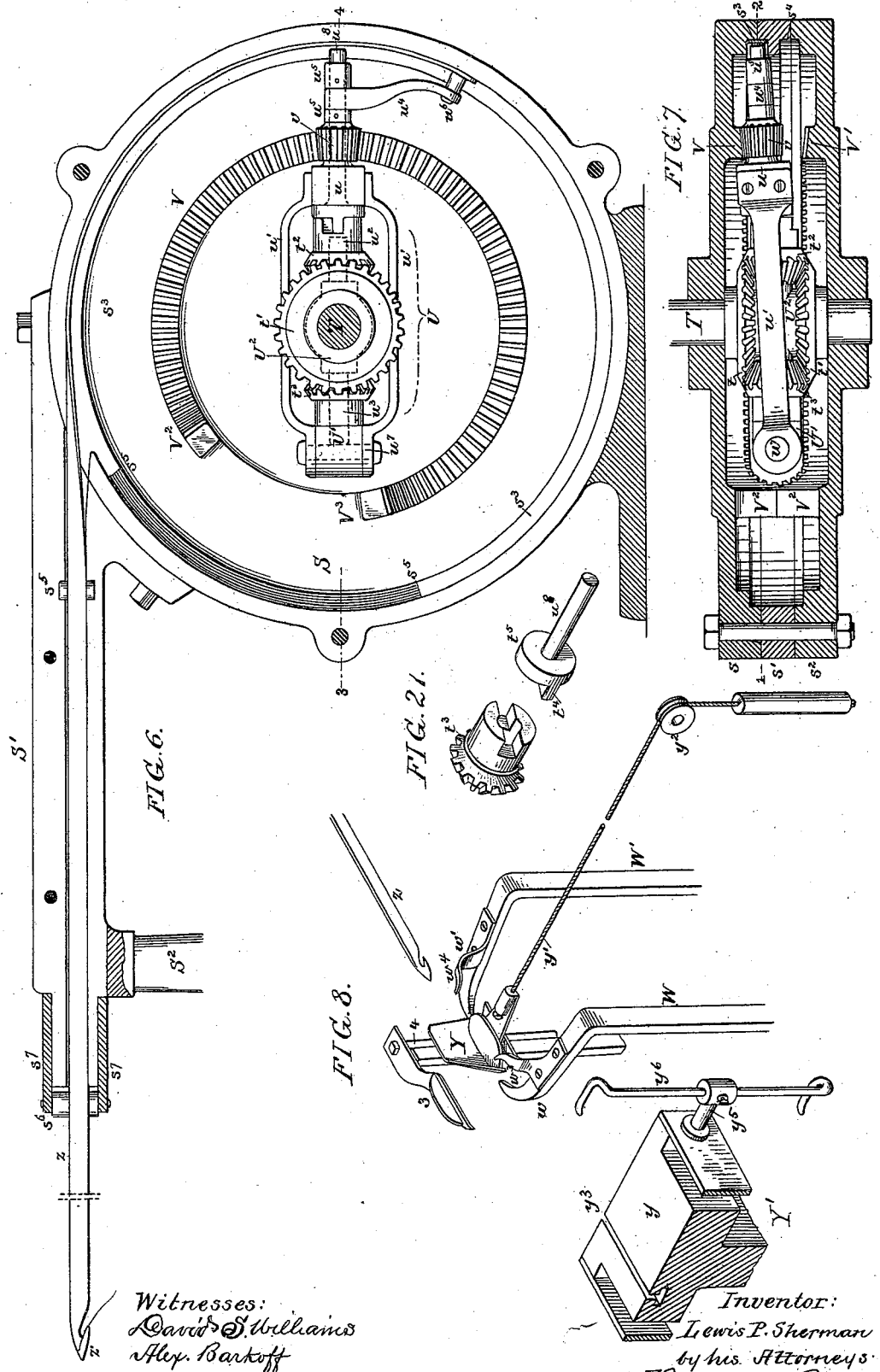

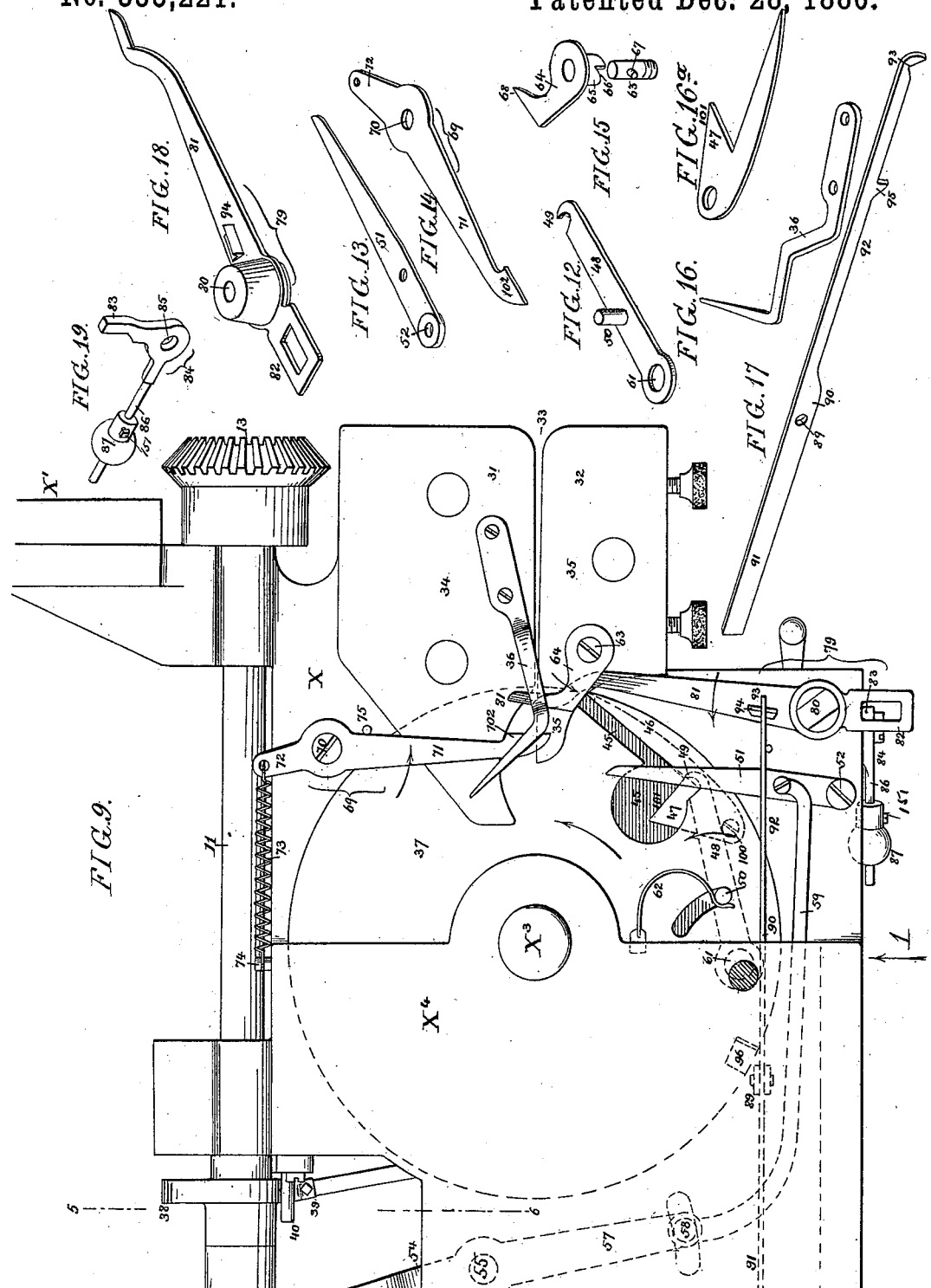

(No Model.) 12 Sheets—Sheet 8.

L. P. SHERMAN.
MACHINE FOR DRAWING IN WARP THREADS.

No. 355,221. Patented Dec. 28, 1886.

Witnesses:
David S. Williams.
Alex. Barkoff.

Inventor:
Lewis P. Sherman
by his Attorneys
Howson & Sons

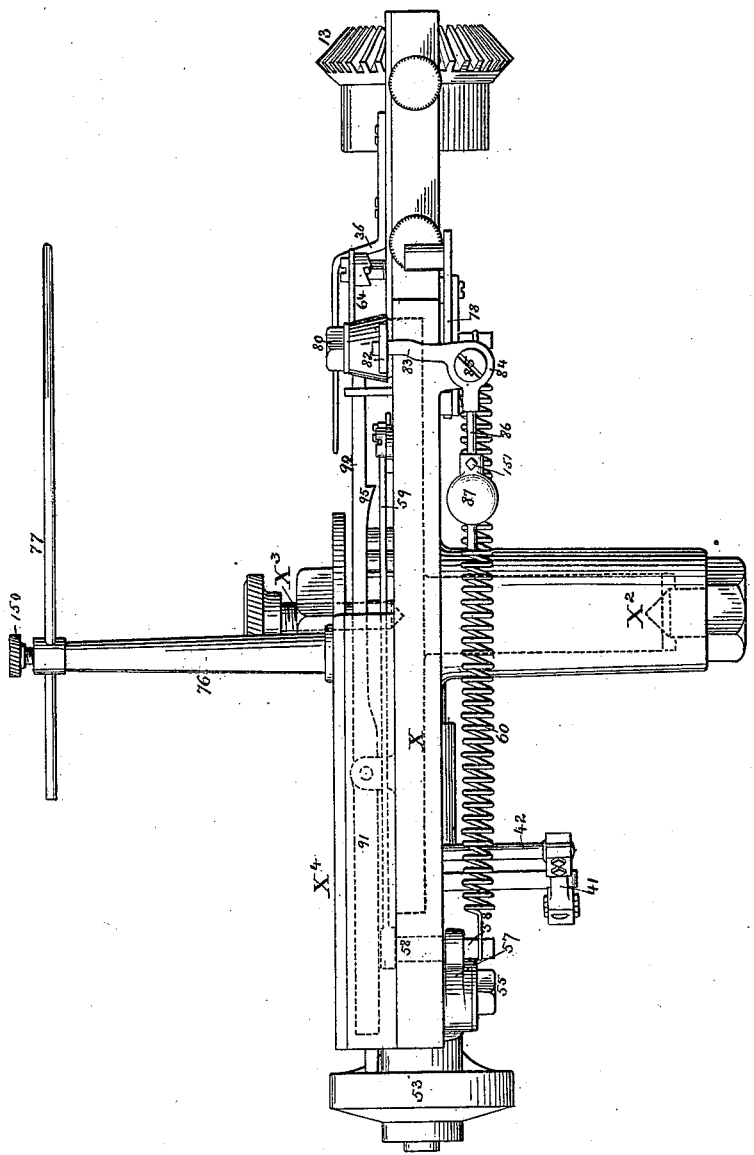

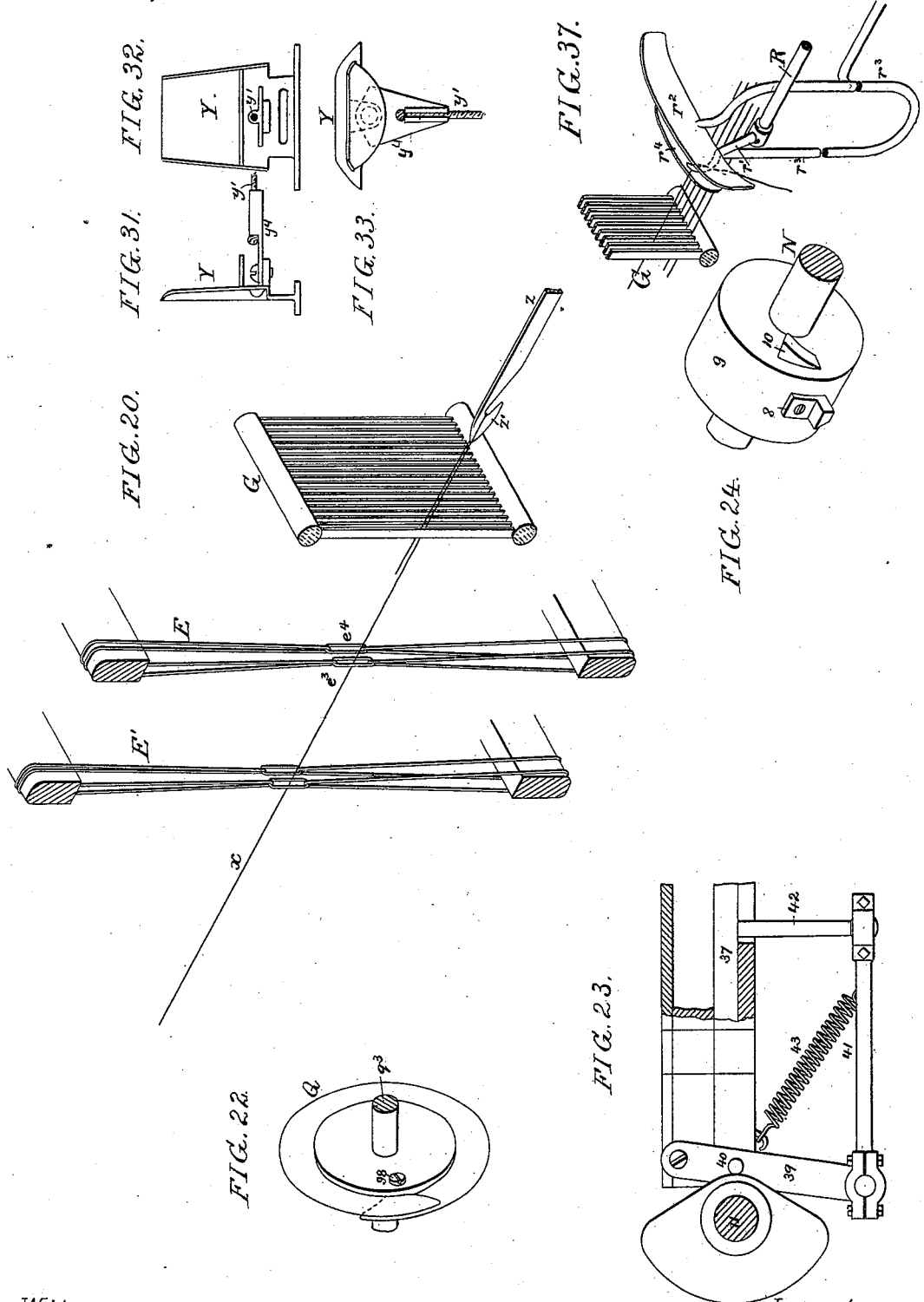

(No Model.) 12 Sheets—Sheet 11.
L. P. SHERMAN.
MACHINE FOR DRAWING IN WARP THREADS.
No. 355,221. Patented Dec. 28, 1886.
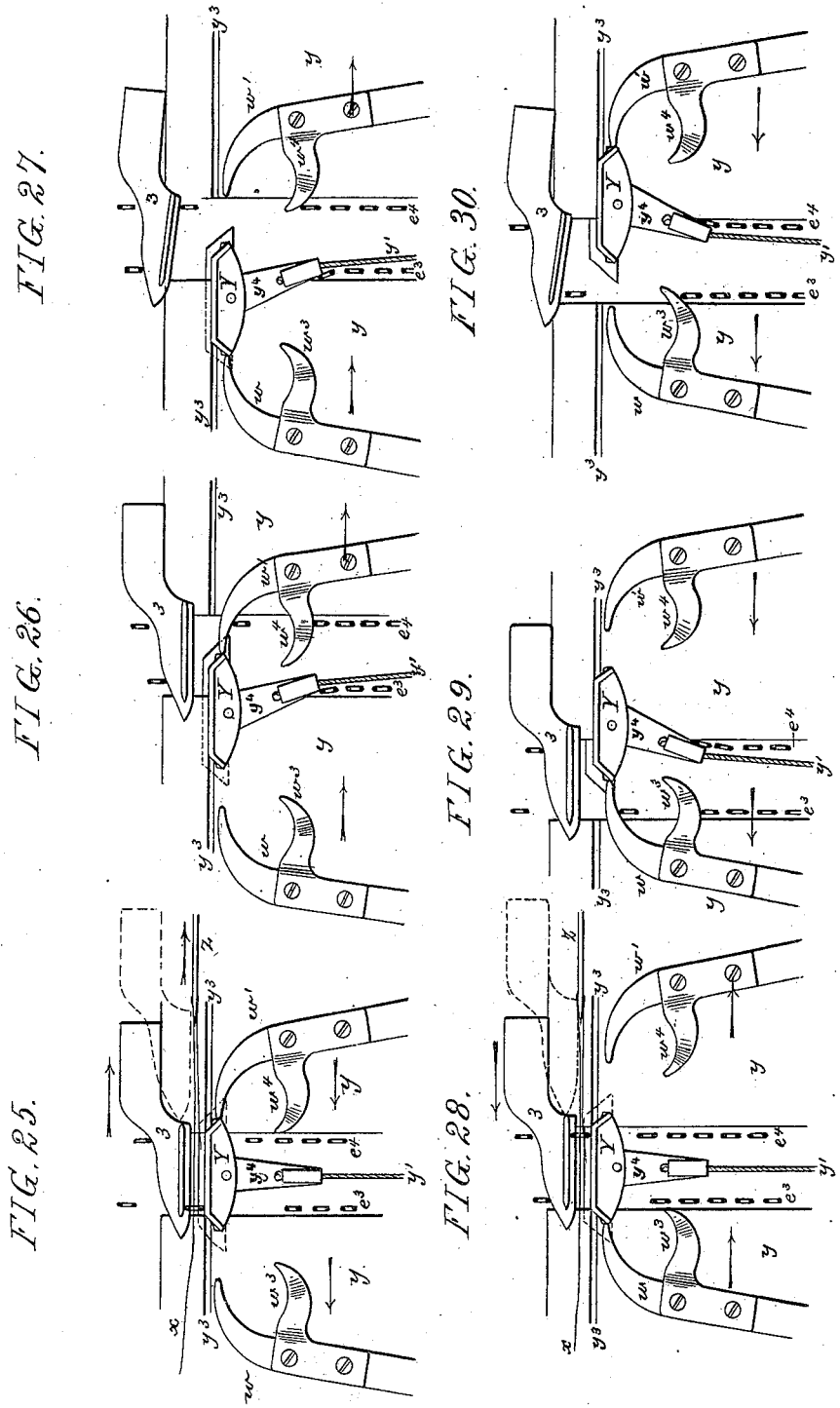
Witnesses:
David S. Williams,
Alex. Barkoff
Inventor
Lewis P. Sherman
by his Attorneys
Howson & Sons

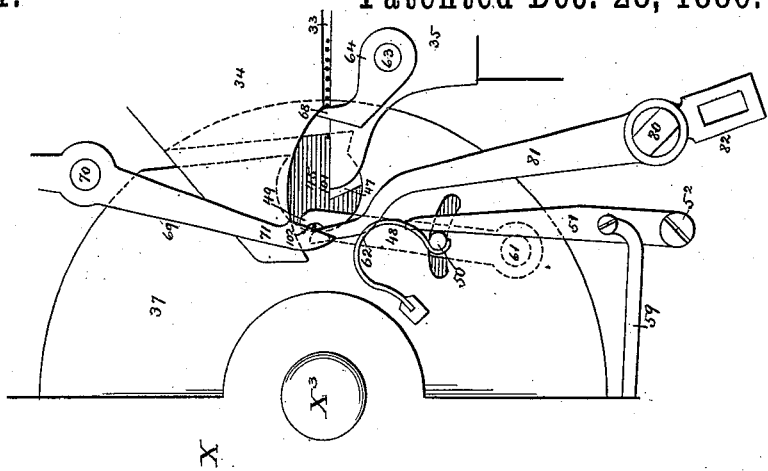
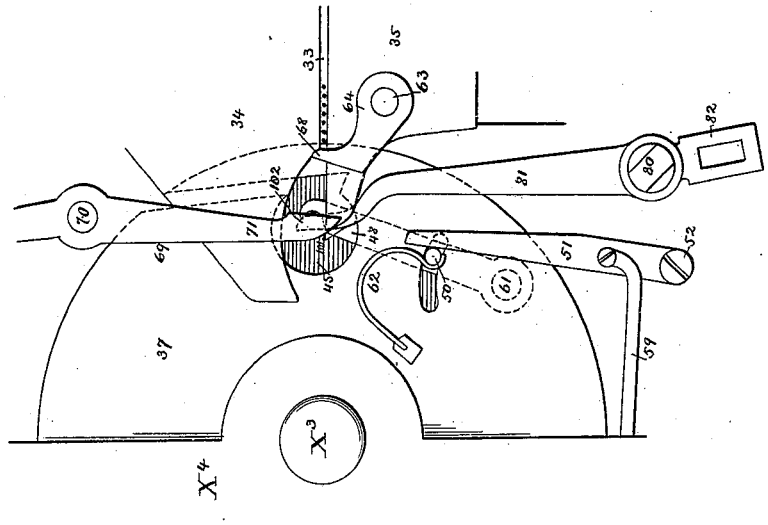
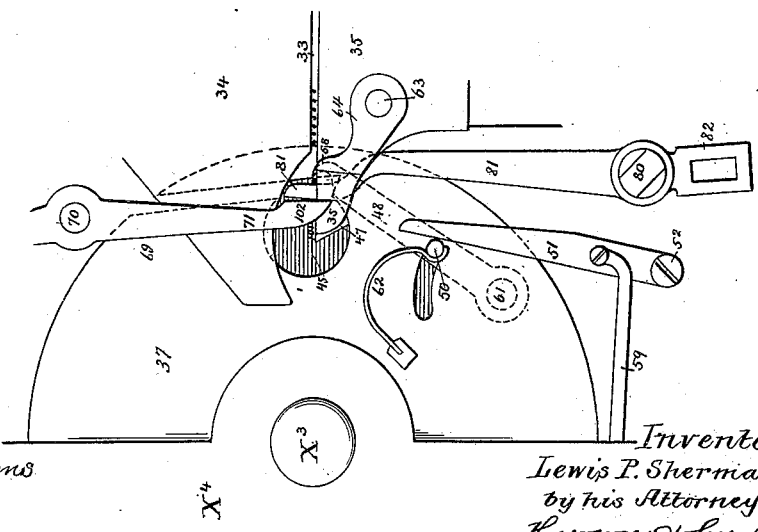

UNITED STATES PATENT OFFICE.

LEWIS P. SHERMAN, OF BIDDEFORD, ASSIGNOR TO GEORGE MOORE, OF BERWICK, MAINE.

MACHINE FOR DRAWING IN WARP-THREADS.

SPECIFICATION forming part of Letters Patent No. 355,221, dated December 28, 1886.

Application filed March 10, 1886. Serial No. 194,683. (No model.)

*To all whom it may concern:*

Be it known that I, LEWIS P. SHERMAN, a citizen of the United States, residing in Biddeford, York county, Maine, have invented certain Improvements in Machines for Drawing in Warp-Threads, of which the following is a specification.

My invention consists of certain improvements in the machines for drawing in warp-threads shown in Letters Patent No. 255,038, March 14, 1882, and in Letters Patent No. 282,124, July 31, 1883.

My improvements relate, first, to mechanism for reciprocating the intermittently-traversed needle, in place of the device shown in the aforesaid patents; second, to mechanism for separating the heddles; third, to mechanism for selecting the warp-threads and placing them in the path of the needle; and, fourth, to the general construction of the machine.

Figure 1:
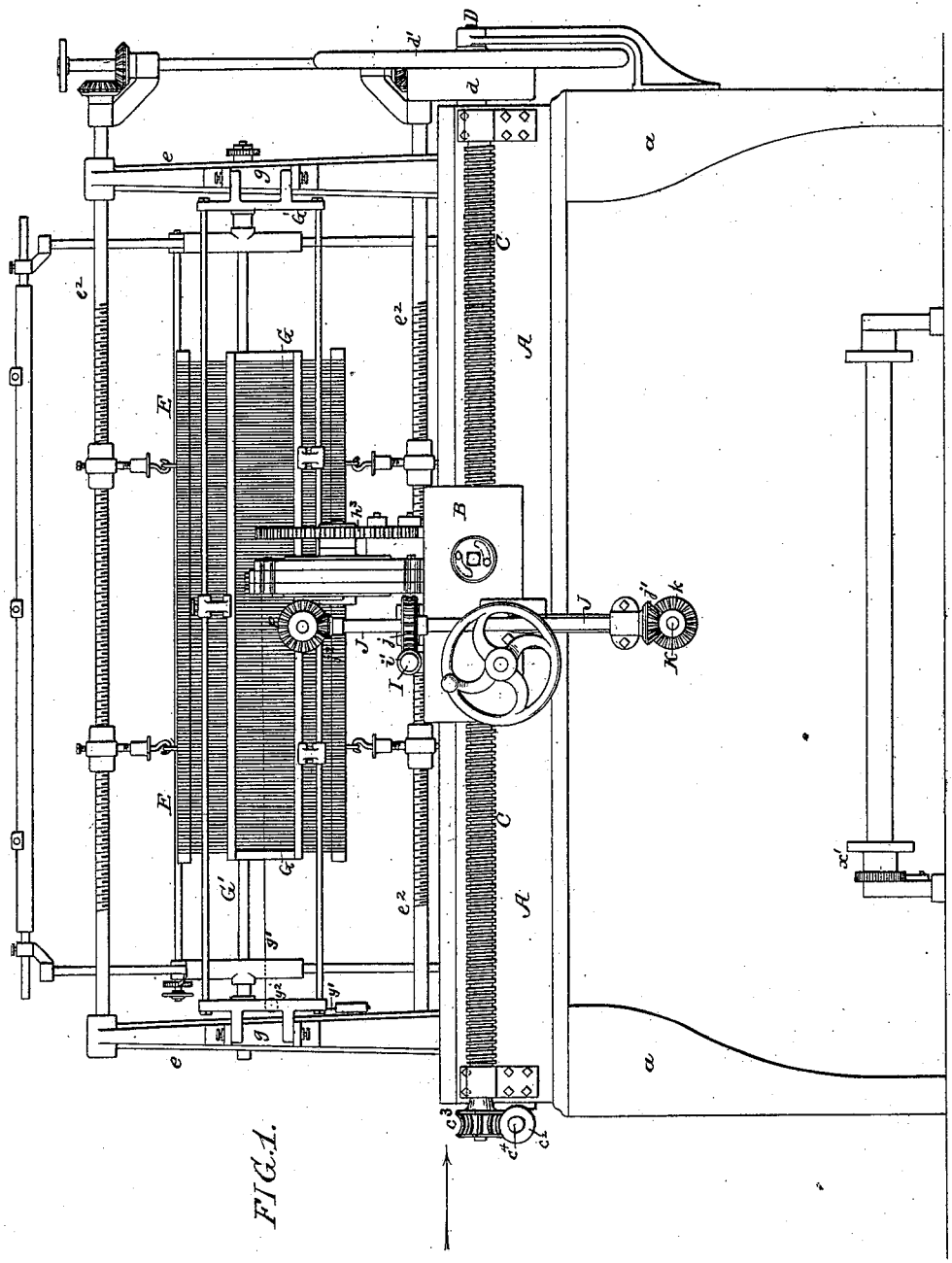
Figure 3:
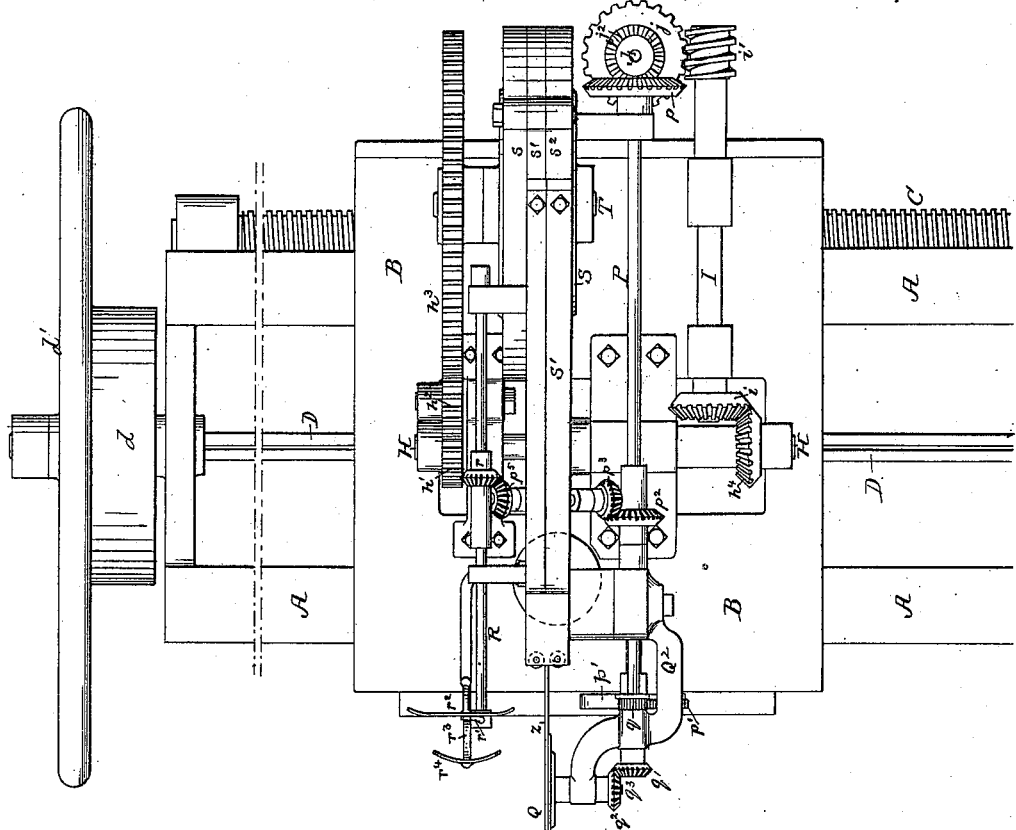
Figure 10:
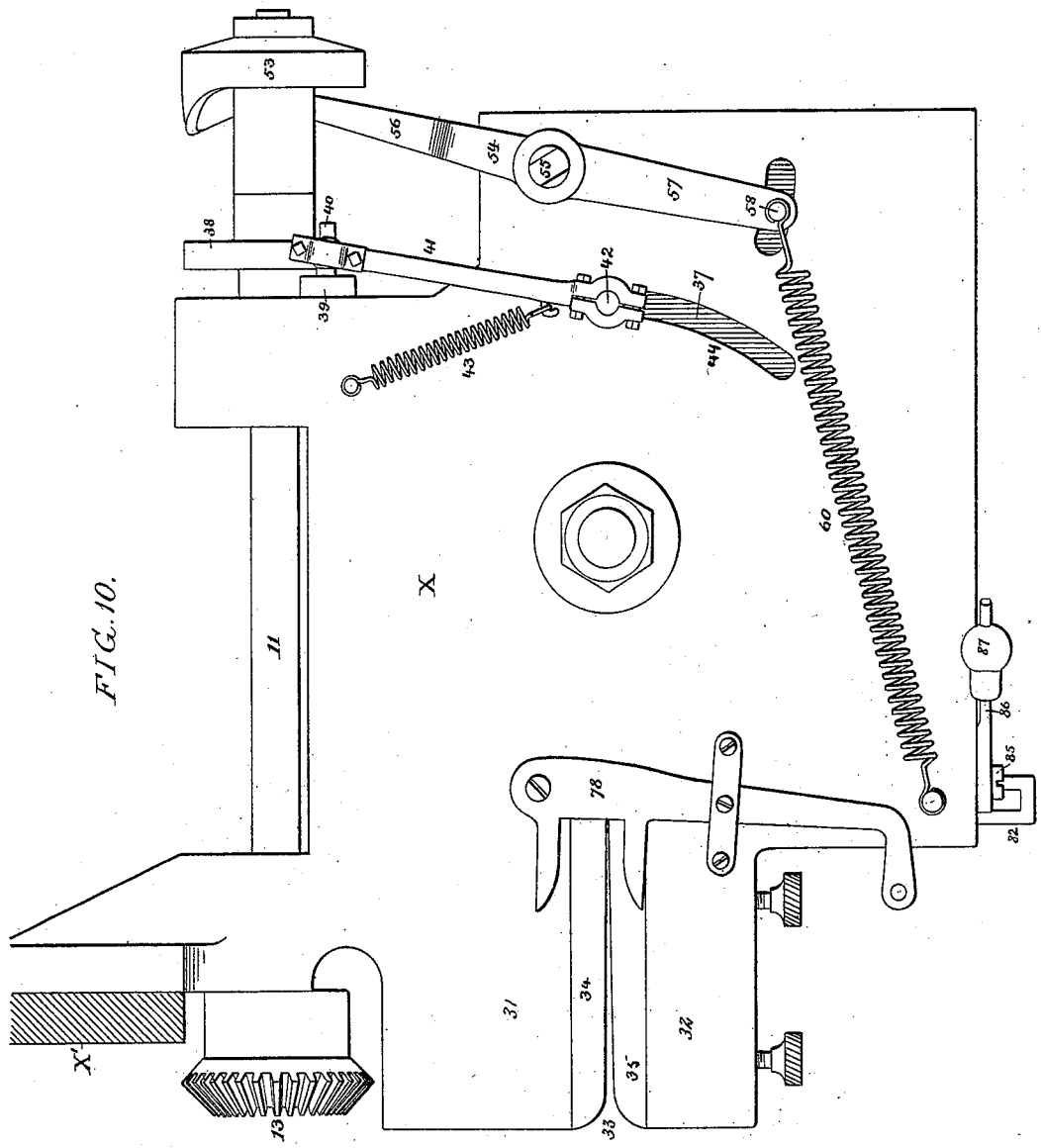

In the accompanying drawings, Figure 1 is a front view of the warp-drawing machine with my improvements; Fig. 2, an end view of the machine, looking in the direction of the arrow, Fig. 1; Fig. 3, a plan view of part of the machine, showing the needle mechanism, reed-separator, heddle-separators, and thread-selecting devices. In this view I have deemed it best to omit all distance-lines which would be shown under the thread and heddle separators, and I also omit the reed and heddles, their position being indicated by dotted lines. Fig. 4 is a side view partly in section, and looking in the direction of the arrow 1, Fig. 3. Fig. 5 is a side view partly in section, and looking in the direction of the arrow 2, Fig. 3. Fig. 6 is a sectional view of the needle-traversing mechanism on the line 1 2, Fig. 7. Fig. 7 is a sectional plan on the line 3 4, Fig. 6, partly in elevation; Fig. 8, a detached perspective view of part of the heddle-separating mechanism; Fig. 9, an enlarged plan view of the thread-selecting device; Fig. 10, an inverted plan view of the thread-selecting device; Fig. 11, a side view of the thread-selecting device, looking in the direction of the arrow 1, Fig. 9; Figs. 12 to 19, detached perspective views of parts of the thread-selecting device; Fig. 20, a perspective diagram showing the manner of drawing in a warp-thread; Fig. 21, a detached perspective view of part of the needle-traversing mechanism; Fig. 22, a detached perspective view of the reed-dent-separating device; Fig. 23, a section on the line 5 6, Fig. 9; Fig. 24, a detached perspective view of part of the heddle-separating device; Figs. 25 to 30, inclusive, diagrams illustrating the operation of the heddle-separators; Figs. 31, 32, and 33, detached views of the heddle-separators; Figs. 34, 35, and 36, diagrams illustrating the operation of the thread-separator, and Fig. 37 a perspective view of the clearing device.

Although the present machine is similar in its general function and operation to the machines shown in the patents above mentioned, the details are so different that a full description both of the construction and operation of the machine will be necessary.

I will describe each of the following parts of the machine separately and in detail in order to simplify the specification: first, the general construction and driving mechanism; second, the needle-operating mechanism; third, the reed-dent separator; fourth, the heddle-separating mechanism; fifth, the mechanism for selecting the warp-threads; sixth, the device for carrying the free ends of the warp-threads out of the path of the needle.

I will first describe the general construction and driving mechanism, reference in this description being mainly to Figs. 1, 2, 3, 4, and 5.

The frame-work of the machine may be of any suitable construction. In the present instance it consists of a bed, A, supported on suitable legs, $a$, and having guides, to which is adapted a traversing carriage or slide, B, the latter being fed from right to left by means of a feed-screw, C, driven from the main shaft D of the machine through the medium of the worm $c$, worm-wheel $c'$, shaft $c^t$, worm $c^2$, and worm-wheel $c^3$, as fully shown in Figs. 1 and 2. The carriage has a nut, C', engaging with the screw-shaft; but this nut can be released from the control of the screw, as in the former machines, when it is desired to stop the movement of the carriage, the nut C' being made in two parts, and so acted upon by a face-cam on the handle, when the latter is turned in either direction, that the parts will engage with or be released from the control of the screw. (See dotted lines, Fig. 5.) This is practically the same construction as is used on the slide-rests of screw-cutting lathes. The driving-shaft D has the ordinary driving-pulley, $d$, and fly-wheel $d'$, as shown in Figs. 1 and 3.

Attached to the back of the frame A are brackets $a'$, on which are posts $e\ e'$, for supporting the cross-bars $e^2$, to which the heddles E E' are hung, and on the outer ends of the brackets $a'$ are brackets $a^2$, for supporting the adjustable arms $f$, to which is pivoted the frame F, having connected thereto the free ends of the warp-threads $x$. This frame is similar to the one fully explained in Patent No. 282,124, granted to me July 31, 1883. To brackets $g$ on the posts $e$ is hung a frame, $G'$, in which is held the reed G, as shown in Fig. 1.

The driving-shaft D is geared to a short shaft, H, on the carriage B through the medium of the spur-wheels $d^2\ h$, Fig. 4, and said shaft H is geared through the medium of the train of gears $h'\ h^2\ h^3$ to the shaft T of the needle-reciprocating device, the detailed construction of which device will be described hereinafter.

The heddle-separating and the warp thread-selecting devices are driven from the shaft H through the medium of the shaft I, which is geared to said shaft H by means of bevel-gears $h^4$ and $i$, Fig. 3, the shaft I being geared to an upright shaft, J, by a worm, $i'$, and worm-wheel $j$, and said shaft J being geared to a transverse shaft, K, by bevel-wheels $j'$ and $k$. The shaft K extends through a sleeve, L, and is geared to an upright shaft, M, by bevel-wheels $k'\ m$, and said shaft M drives the mechanism for selecting the warp-threads, which will be fully described hereinafter. The shaft K is geared, by a pinion, $k^2$, and spur-wheel $n$, to a short shaft, N, running parallel with the shaft K, and the shaft N is geared to the sleeve L by a pinion, $n'$, and spur-wheel $l$, the wheels being so proportioned that the sleeve L will make but one revolution and the shaft N but two revolutions to four revolutions of the shaft K.

The mechanism for separating the dents of the reeds and that for carrying the threads away from the path of the needle after passing through the heddles and reeds are driven from the shafts H, I, and J, the shaft J having at its upper end a bevel-wheel, $j^2$, which gears into a bevel-wheel, $p$, on a shaft, P, having a segment gear-wheel, $p'$, at its inner extremity, said segment-gear engaging with a pinion, $q$, so as to impart thereto intermittent movements and lock it between such movements. The pinion $q$ is carried by a short shaft having a bevel-wheel, $q'$, which gears into a bevel-wheel, $q^2$, on a shaft, $q^3$, the latter being provided with the reed-dent separator Q, the construction of which is described hereinafter.

The shaft $q^3$ is carried by a frame, $Q^2$, which is hung to a stud on a frame, $S'$, of the carriage B, so that the reed-dent separator can be thrown up away from the reed when desired.

The device for carrying the warp-thread away from the path of the needle is constructed and driven in the following manner:

On the shaft P is a bevel-wheel, $p^2$, which meshes with a bevel-pinion, $p^3$, on a shaft, $p^4$, having a bevel-wheel, $p^5$, which gears into a bevel pinion, $r$, on a shaft, R, the inner end of the latter being provided with a hooked arm, $r'$, which in its revolution passes a plate, $r^2$, secured to an arm on the carriage in any suitable manner. Secured to the same arm is a bent arm, $r^3$, having a guard-plate, $r^4$, over which the thread is laid by the hooked arm $r'$ as it takes it from the needle.

It will be seen by the foregoing description that the entire mechanism is driven from the shaft D, and that all of said mechanism, with the exception of the screw C, is carried by the traversing carriage B, thus dispensing with the complicated gearing shown and described in my former patent.

Having now described the general driving-gear of the machine, I will describe in detail the construction of the various mechanisms driven thereby. The first of these is the needle-operating mechanism, in describing which reference is made mainly to Figs. 1, 2, 3, 4, 5, 6, 7, and 21.

Secured to the top of the carriage B is a cylindrical casing, S, made in three parts, $s\ s'\ s^2$, as shown in Fig. 7, the parts $s\ s^2$ forming the bearings for the shaft T, which is geared to the shaft H on the carriage through the train of gears $h'\ h^2\ h^3$, previously described. The shaft T has a continuous rotary motion, but the needle $z$ has to have an intermittent reciprocating motion imparted to it, and the rotary motion of the shaft T is converted into such reciprocating motion as follows: The needle $z$ is preferably a flat steel bar, and passes around the inner periphery of the casing S, and, as shown in Fig. 7, is guided in an annular groove, $s^3$, between the parts $s$ and $s'$ of the casing. After leaving the casing S the needle is twisted to an upright position, and passes through a tube, $S'$, secured to the casing S, suitable friction-rollers, $s^5\ s^6$, being placed at intervals along the path of the needle, the friction-rollers $s^5$ being at the point where the needle turns in the tube, and the rollers $s^6$ are at the outer end of the tube and having their bearings in small plates $s^7$, secured to the tube. (See Figs. 3 and 6.) The outer end of the tube $S'$ is supported by a post, $S^2$, projecting upward from the carriage B. The outer end of the needle is barbed, as shown at $z'$, Fig. 6, in order to catch the thread $x$, as described hereinafter. The inner end of the needle is connected, as described hereinafter, to a frame, U, which consists of a block, $u$, and opposite side bars, $u'$, pivoted at $u^7$ to a block, $U'$, secured to a sleeve, $U^2$, on the shaft P, and shown in Figs. 6 and 7.

Projecting from the sleeve $U^2$ are two small shafts or studs, $u^2\ u^3$. (Shown by dotted lines in Fig. 6.) The shaft $u^2$ carries a pinion, $t^2$, and the shaft $u^3$ carries a pinion, $t^3$, and the block U'. On the shaft T are two bevel-wheels, $t\ t'$, the wheel $t$ being fast on the shaft, and the wheel $t'$ loose, and meshing with these bevel-wheels are the two bevel-pinions $t^2\ t^3$, which are loose on their respective shafts or studs $u^2\ u^3$, the bevel-wheel $t'$ and pinion $t^3$ being merely idlers, and being used to impart the power of the wheel $t$ to the pinion $t^2$ on the side opposite that which is directly in gear with said bevel-wheel $t$, so as to insure an even and regular movement of said pinion. The hub of the pinion $t^2$ is slotted, as shown in Fig. 21, for the reception of a tongue, $t^4$, projecting from a collar, $t^5$, secured to a shaft, $u^8$, which is journaled in the block $u$ of the frame U, this connection permitting the free swinging of the pivoted frame U, for a purpose described hereinafter.

Secured to the shaft $u^8$ is a bevel-pinion, $v$, which meshes with an endless duplex segmental rack, comprising the segmental racks V V' on the inner surfaces of the parts $s\ s^2$ of the casing S, and the short semicircular racks $V^2\ V^3$, which connect the ends of the said rack V to the ends of the rack V', Figs. 6 and 7. The shaft $u^8$ projects alternately into grooves $s^3\ s^4$, formed by the parts $s\ s'\ s^2$ of the casing S, and loose on the shaft $u^8$ is an arm, $u^4$, held in place by the collar $u^5$, the outer end of the arm being connected to the inner end of the needle $z$ by a pin, $u^6$. (See Fig. 6.) As the pinion $v$ is rotated, it engages first with the rack V, then with the semicircular rack $V^2$, which guides it to the rack V', after traversing which it is directed by the rack $V^3$ back to the rack V, the frame U thus having a movement of partial rotation around the shaft T, first in one direction and then in the opposite direction. The grooves $s^3\ s^4$ merge into each other at $s^5$, so that the projecting end of the shaft $u^8$ may pass from one groove to the other as the pinion $v$ traverses the racks $V^2\ V^3$, the grooves guiding the frame U while the pinion $v$ is traversing the racks V V'.

As the frame U is connected to the inner end of the needle, as above described, the needle will be first projected from the casing S to its full extent and then retracted into the casing, as will be readily understood on reference to Fig. 6, the stroke being rapid, but steady and at uniform speed, with a slight dwell at each limit of the stroke.

The flat needle above referred to and the idea of winding it within and projecting it from a casing are fully set forth in Letters Patent No. 308,784, granted December 2, 1884, to George Moore; hence I have limited my claims to the construction of the devices described for operating such a needle.

The next description in order is that of the reed-dent separator. This device is shown in Figs. 2, 3, 4, 5, and 22, and comprises simply a disk having a flange, Q, with overlapping ends, the flange being free from connection with the disk for some distance from its opposite ends, so that said ends can be sprung apart from each other to any desired extent by means of the set-screw 98. (Shown in Fig. 22.) The bent ends of the flange thus act as a screw-thread, and as the disk rotates the forward end of the flange enters dent after dent of the reed in succession, and as the rotating movement of the reed-dent separator is intermittent, while the traversing movement of the carriage B is constant, it follows that the flange, after entering the dent of a reed, must remain therein while the carriage moves laterally to a certain extent, the dent being thus spread for the passage of the needle, which makes one reciprocation for each operation of the reed-dent separator. The lateral adjustment of the ends of the flange Q, by means of the set-screw 98, serves to adapt the reed-dent separator to reeds of different gages.

In the machines shown in the former patents no reed-dent separator was used; but I find that by the use of the same friction on the needle is reduced and the skipping of dents prevented.

The special construction of the above-described dent-separating device is described and claimed in a separate application for patent filed by me November 19, 1886, Serial No. 219,394, and hence forms no part of my present invention, the illustration and description of the construction of the reed-dent separator being introduced in this specification simply as part of the general illustration and description of the machine.

I will now describe the heddle-separating mechanism, reference in this description being made to Figs. 1, 2, 3, 4, 5, 8, 20, 24, 25, 26, 27, 28, 29, 30, 31, 32, and 33. It will be understood that similar operations are effected in this machine as in the machines referred to in the former patents—that is to say, referring to Fig. 20, the needle $z$ passes first through the reed G, then through an eye of the heddle E, then between two eyes of the heddle E', and receiving a warp-thread, $x$, draws it between the eyes of the heddle E', through the eye of the heddle E, and through the dent in the reed; but on the next stroke, owing to the movement of the carriage B, the needle $z$ passes through an adjoining dent in the reed, between two eyes of the heddle E, and through an eye of the heddle E', and receiving another warp-thread $x$ draws it through the eye of the heddle E', between the eyes of the heddle E, through the dent in the reed, and so on until all the warp-threads have been drawn through the heddles and reed.

In the Patent No. 255,038 is described a heddle-eye separator consisting of an anchor-lever hung to a rock-shaft operated from the side of the machine, and in the Patent No. 282,124 the eyes of the heddles were separated by vibrating hooks; but in my present machine I dispense with the anchor-lever and hooks, and use what may be termed a "shuttle," Y, acted upon by fingers $w\ w'$, forming part of two long arms, W W', which are secured to a rock-shaft, $w^2$, free to turn in suitable bearings on a bracket, B', secured to the carriage B. The shaft $w^2$ has an arm, $w^5$, a pin on which projects into a cam-slot in a drum, L', on the sleeve L, this cam-slot being so shaped as to impart to the arms W W' and shuttle Y the intermittent movements explained hereinafter in connection with the diagrams Figs. 25 to 30.

The eye-separating mechanism for the heddle E' is precisely similar to that for the heddle E, excepting only in the position of the cam L' on the sleeve L, said cam being so set in respect to the cam L that the heddles are acted upon alternately; hence in the following description I will refer only to the devices for acting upon the heddle E.

The shuttle Y slides in grooves or ways $y^3$ in plates $y$ on posts Y', extending upward from the bracket B', and is connected to a cord, $y'$, which passes between the cords of the heddle about in line with the eyes. The cord is weighted at its outer end and passes over a pulley, $y^2$, Fig. 8, hung to a bracket on the frame $e$, so that when said cord $y'$ is passed between the cords of the heddles at or above the eyes it will separate the cords into two distinct rows, as shown in Figs. 25 to 30. The cord is attached to the shuttle by a pivoted plate, $y^4$, so that it will not interfere with the movement of the shuttle from a rear position first to a mid-position, then to a forward position, and then back again. A spring-actuated finger, 3, of the form shown in Fig. 8, serves to hold the heddle-eye against the face of the shuttle Y, and when the eye is threaded moves said threaded eye out of the path of the needle $z$, this finger 3 being connected to a rod, 4, having its bearings on a lever, 5, and being acted upon by a spring, 6, one end of which is attached to the rod 4, and the other end to the lever 5.

Near the lower end of the rod 4 is an arm, 7, which is struck at intervals by a toe, 8, on a drum, 9, on shaft N, Fig. 24, so as to vibrate the rod and its finger, the rod being restored to position by the spring 6, and on the end of the drum 9 is a cam, 10, which acts upon and vibrates the lever 5, the latter being restored to position by a spring, 99, Figs. 4 and 5. Secured to brackets $y^5$ on the plates $y$, at each side of the opening for the passage of the heddles, are vertical rods $y^6$, Fig. 3, bent at their ends, as shown in Fig. 8, for the purpose of keeping the heddle-cords in proper line with the opening across which the shuttle Y moves.

I will now describe the operation of the devices for separating the heddle-eyes, reference being had to the diagrams Figs. 25 to 30, inclusive.

In the first place it will be understood that where two heddles are used, as in the present instance, the eyes of the rear heddle are all held out of the path of the needle while a single eye of the front heddle is being threaded, and the eyes of the front heddle are then held out of the way while an eye of the rear heddle is threaded, these alternate actions continuing until all the eyes of both heddles are threaded. Where three, four, or more heddles are to be threaded in one machine, the eyes of all but one heddle must be held back during the threading of the eye of that heddle, as will be readily understood by those skilled in the art to which my invention relates; but this will merely require a duplication of the separating devices and a proper timing of the operating-cams.

In the diagram Fig. 25 the heddle E is represented by two lines of heddle-eyes, $e^3 e^4$, and one of the heddle-eyes, $e^3$, is being threaded, the needle having passed through the eye, and being shown as receding in the direction of its arrow.

It will be seen that the heddle-eye, $e^3$, that is being threaded is held between the face of the shuttle Y and the face of the finger 3, the shuttle holding back all the other eyes. After the needle has passed through the eye, the finger 3 is moved in the direction of its arrow to the position shown by dotted lines, Fig. 25, thereby permitting the threaded eye $e^3$ to pass out of the path of the needle, and the finger 3 then returning so as to force the threaded eye $e^3$ still more out of the path of the needle, until it assumes the position shown in Fig. 26. The parts remain in the position shown in Fig. 25, with the exception of the above-described vibration of the finger 3, until an eye of the heddle E' is threaded, the eyes of the heddle E being thus kept out of the path of the needle. After the needle has passed through an eye in the heddle E', the shuttle is moved by the finger $w'$ from the mid-position shown in Fig. 25 to the position shown in Fig. 26, the first eye of the series, $e^4$, being permitted to come into contact with the finger $w'$, but the other eyes of the series being held back by a finger, $w^4$, projecting from the finger $w'$. The finger $w'$ pushes the shuttle to the position shown in Fig. 27, and the movement of the fingers is then reversed; but the distance between the ends of the fingers $w$ $w'$ is greater than the length of the shuttle; hence during this reverse movement the shuttle is stationary, and as the finger $w'$ is withdrawn there is a sufficient opening between the end of the shuttle and the edge of the plate $y$ to permit the passage of the eye $e^4$, the forward movement of which is limited by the finger 3, which has been retracted by the action of the toe 8 to the position shown in Fig. 27. The shuttle Y is then moved by the finger $w$ to the mid-position shown in Fig. 28, and the finger 3 is brought to bear on the eye $e^4$, the latter being in the proper position for the passage of the needle $z$, after which the finger 3 is again quickly vibrated to permit the threaded eye $e^4$ to pass out of the path of the needle, the finger returning immediately to force the threaded eye $e^4$ still further out of said path. After this the devices remain stationary until another eye of the heddle E' is threaded, whereupon the shuttle is moved by the finger $w$ to the position shown in Fig. 29, another eye $e^3$ being permitted to come into contact with the finger $w$, and the other eyes $e^3$ being held back by the finger $w^3$. As the fingers $w\ w'$ move back in the direction of their arrows, Fig. 29, to the position shown in Fig. 30, the eye $e^3$ moves up against the face of the retracted finger 3, and on the continued movement of the fingers $w\ w'$ the shuttle assumes the mid-position shown in Fig. 25, the eye $e^3$ is clamped by the finger 3, and the above-described operations are repeated.

The mechanism for selecting the warp-threads is shown especially in Figs. 9, 10, 11, 23, 34, 35, and 36. By this mechanism the warp-threads $x$ are successively selected and carried one at a time against the needle $z$ in a position to insure their being caught by the hook $z'$ as the needle is retracted, so as to be drawn thereby through the eyes of the heddles and between the dents of the reed.

X is the plate carrying the selecting mechanism, this plate being secured to a bracket or extension, X', on the outer end of the bracket B', as shown in Figs. 4 and 5. To bearings at one side of this plate X is adapted a shaft, 11, which is driven from the shaft K through the medium of the upright shaft M, previously referred to, which is geared to the shaft 11 by bevel-wheels 12 and 13.

On the shaft M is a bevel-wheel, 14, Fig. 4, which gears into a wheel, 15, on a shaft, 16, which drives the mechanism for operating a pair of nippers, the latter being vibrated and alternately opened and closed, so as to take up any slack in the warp-threads as they are presented to the selecting mechanism. The motion of this device is similar to that described in the former Patent No. 255,038, and the operating mechanism is driven from the shaft 16 in the following manner: A lever, 17, is pivoted to the standard X' at 18, and has two arms, 19 and 20, the former being connected to a pin, 21, projecting from a disk, 22, on the shaft 16, and the arm 20 carrying one of the jaws of the nippers. A lever, 23, is pivoted to a stud, 24, on a bracket, 25, one arm, 26, of the lever being connected to the lever 17 at 27, and the other arm, 28, carrying the other jaw of the nippers. Both jaws are supplied with face-plates, which can be removed when required, and the plate 29 on the jaw of the arm 28 is yielding, being pressed toward the opposite jaw 20 by a spring, 30. As the shaft 16 revolves, the jaws are brought together, then have a short downward movement, and then separate, the pivot-pins 18 and 24 passing through slots which permit this downward movement of the jaws, which tends to stretch and take up any slack in the warp-threads before the latter are presented to the selecting devices.

Before describing the different parts of the selecting device I would say that the purpose of said device is to carefully select one thread at a time and place it in the path of the needle on each intermittent reciprocating movement of the latter. If two threads chance to pass the first barrier of the device, part of the selecting device is automatically stopped, permitting the selector to separate the one thread from the other and place it on the needle on one reciprocation of the same, the other thread being placed on the needle on the next reciprocation, whereupon the selecting device is again set in operation, as more fully set forth in the explanation of the operation of the machine which follows the description of the parts.

The plate X is provided with two extensions, 31 and 32, forming between them a narrow slot, 33, of sufficient width to contain the warp-threads. On these extensions are adjustable plates 34 and 35, the inner edge of the plate 35 forming the bearing-edge for the warp-threads as they are fed to the selecting devices, or, rather, as the selecting devices are fed to the warp-threads on the movement of the carriage B.

The means for adjusting the plates 34 and 35 and securing them in position after adjustment are similar to those shown and described in Letters Patent No. 255,038, March 14, 1882.

The arm 36, Figs. 9 and 16, forces the threads over against the bearing-edge, and before each selection the nippers, which are situated below the plate X, drag the threads along the bearing-edge, causing them to assume a single line, and preventing any tendency of the threads to bunch.

It may be well to remark here that the warp-threads $x$ are wound on the warp-beam $x'$, journaled in bearings in a suitable stand on the floor, and said threads pass up over the cross-bars of the pivoted frame F, and are clamped both at top and bottom in the manner described in my Patent No. 282,124, the lower clamp being such that the end of a thread can be readily withdrawn therefrom under the action of the drawing-needle.

To a recess in the center of the plate X is adapted a disk, 37, which has an intermittent oscillating movement imparted to it from the shaft 11 through the medium of the cam 38, pivoted arm 39, connecting-rod 41, and pin 42, the arm 39 having a pin, 40, on which the cam 38 acts, and the rod 41 being connected by ball-and-socket joints both to the arm 39 and to the pin 42, the latter projecting from the under side of the disk 37 through a slot, 44, in the plate X. A spring, 43, tends to retract the disk after it has been moved forward under the influence of the cam 38. (See Figs. 9, 10, and 23.) The disk 37 has a recess, 45, as shown in Fig. 9, the portion between this recess and the periphery of the disk forming a shield, 46, for a selecting-hook, 47, Fig. 16$^a$, which is secured by a screw, 100, to the under side of the disk, said hook having a right-angled edge, 101, and being adjustable on the screw as a pivot, so that its point is adapted to select warp-threads of different sizes.

Pivoted to the disk 37 at the point 61 is an arm, 48. (Shown more clearly in the detached view, Fig. 12.) This arm is hooked at its outer end and has a comparatively sharp point, 49, which is in line with the corner formed by the angle of the two faces of the selecting-hook 47, as will be seen in Fig. 9. A spring, 62, secured at one end to a projection on the disk 37, bears against a stud, 50, on the arm 48, said stud projecting through a curved slot in the disk, and on each vibration of the disk 37 the stud 50 comes into contact with an arm, 51, pivoted to the plate X at 52, and shown in detail in Fig. 13. This arm has a vibrating movement imparted to it from a face-cam, 53, secured to the shaft 11, Fig. 9, and acting on a lever, 54, pivoted at 55 to the under side of the plate X, Fig. 10, one arm, 56, of the lever bearing against the cam 53, and the other arm, 57, having a pin, 58, which passes through a slot in the plate X, and is connected to the arm 51 by a rod, 59, as shown in Fig. 9. A spring, 60, is secured at one end to the pin 58, and at its opposite end to a stud projecting from the under side of the plate X, this spring tending to keep the arm 56 of the lever 54 always in contact with the cam 53.

To a stud, 63, is hung an arm or dog, 64, Fig. 15, this dog having a sleeve, 65, which is recessed to form an inclined plane, 66, which rests against a lug, 67, on the side of the stud 63. When under the action of a warp-thread the dog is pushed in the direction of the arrow, Fig. 9, the inclined portion of the sleeve 65 rises on the lug 67, and as soon as the thread is past the point 68 of the dog the weight of the latter causes it to drop back to position again with its point in front of the line of warp-threads and behind the thread which has passed it. A lever, 69, is pivoted at 70 to the plate X, one arm, 71, of the lever having a suitable bearing-edge, 102, for the warp-thread, and the other arm, 72, being connected to a light spring, 73, which is secured to a post, 74, on the plate X. The tendency of the lever is to move in the direction of the arrow, Fig. 9; but this movement is restricted by a stop, 75, on the plate X.

Adjustable on a post, 76, extending upward from the plate X is a curved arm, 77, (shown in Figs. 3 and 11,) the post 76 being shown in section in Fig. 9 and the curved arm omitted to avoid confusion. The arm 77 slides radially through a transverse opening in the post 76, and is secured in position after adjustment by means of a set-screw, 150. This adjustable arm 77 and a pivoted arm, 78, on the under side of the plate X can be so adjusted as to cause the end warp-thread to assume a vertical line between the two bearing-points, so as to be in the best position for being taken up by the selecting-hook 47, these two arms being substantially similar to those shown in the Patent No. 255,038.

The stop-motion for arresting part of the device when two or more threads are taken up by the selecting-hook 47 is constructed in the following manner: A lever, 79, Fig. 18, is pivoted to the plate X at 80, this lever having an arm, 81, which projects across the path of the warp-threads, as seen in Fig. 9. The arm 82 of the lever is slotted, and through this slot passes one arm, 83, of a bell-crank lever, 84, Fig. 19, which is pivoted at 85 to the side of the plate X, and has an arm, 86, with a small weight, 87, adjustable thereon, the lever tending to keep the arm 81 of the lever 79 pressed against the first of the series of warp-threads in the slot 33.

The weight 87 can be adjusted to and fro on the arm 86 of the lever 84, and can be secured in position after adjustment by a set-screw, 151.

Pivoted to the plate X at 89 is a balance-beam, 90, one arm, 91, of which is weighted, so as to almost but not quite counterbalance the other arm, 92, the end 93 of which rests on a knife-edged lug, 94, secured to the arm 81 of the lever 79. The arm 92 has also a projection, 95, which engages with a projection, 96, on the oscillating disk, 37, under the circumstances described hereinafter. The lever 90 is shown more clearly in the detached perspective view, Fig. 17.

It will be noticed that the disk 37 has a long pivot-pin, which extends into a downwardly-projecting bearing, $X^2$, Fig. 11, and is centered by a suitable set-screw, $X^3$, passing through a bracket, $X^4$, forming part of the plate X, and covering about one-half of the working parts, as will be seen on reference to Figs. 9 and 11.

The operation of the selecting device is as follows: As the carriage is fed forward, the warp-threads are formed in line along the edge of the plate 35, and are also pressed against this edge not only by the arm 36, but also by the nippers formed by the levers 17 and 23 beneath the plate X. As the needle is on its outward movement, the disk 37 begins to move in the direction of its arrow, and the hook 47 selects the first warp-thread of the series in line along the edge of the plate 35, as shown in the diagram Fig. 34, the thread resting in the angle between the face of the hook and the edge 101 of the same, where it is caught up by the hook 49 of the arm 48, the latter being moved in the direction of its arrow by contact of the stud 50 with the arm 51, which is actuated by the cam 53 on the shaft 11, as described above. The movement of the arm 48 forces the thread against the arm 71 of the lever 69 and forces the latter backward, and at the same time it moves outward the arm 81 of the lever 79, which is outside of the thread. (See Fig. 35.) The arm 48 lays the thread against the hooked face of the needle, which by this time has completed its outward movement, the spring-actuated lever 69 serving to keep the thread under proper tension, so that when the needle is retracted the hook $z'$ catches the thread and carries it back through the eye of the heddle, and through the reed. When the disk 37 reaches the limit of its forward movement, it is, owing to the shape of the cam 38, retained in this position for a time, and when the arm 81 of the lever 79 is drawn forward by the thread the support of the lug 94 is removed from the long arm of the lever 90, and said long arm falls, so that the lug 95 engages with the lug 96 on the disk, and prevents any backward movement of the latter under the influence of the spring 43. When the thread is drawn forward by the needle, however, the long arm of the lever 79 resumes its normal position, Fig. 9, the lug 94 lifts the long arm of the lever 90, and the lug 96 of the disk is freed from the control of the lug 95 of said lever 90. If at any time two threads should happen to be taken up by the selecting-hook 47, both threads will eventually reach the corner formed by the edge of the hook and the edge 101, where they will invariably lie side by side along the edge of the hook 47, as they are pressed upon by the face 102 of the lever 69, and thus prevented from riding over each other. When the arm 48 moves in the direction of its arrow, it will only catch that one of the threads which is at the angle between the face of the hook and the edge 101, the other thread remaining in its position, so that when the arm 81 of the lever 79, on the drawing out of the first thread by the needle, falls back toward its normal position, the remaining threads, being in the position shown in Fig. 36, will arrest the lever before the lug 94 reaches such a position as to lift the arm 92 of the balance-lever 90, the lug 95 of which consequently remains in engagement with the lug 96 on the disk 37, and thus prevents any backward movement of said disk under the action of the spring 43, the movement of the selecting-arm 48, under the influence of the arm 51, continuing, however, so that on the next outward movement of the needle the remaining thread will be taken up by the selecting-arm in the same manner as the one previously taken up, and placed in the path of the needle, and as it is withdrawn the lever 79 is released and resumes its normal position, Fig. 9, thereby freeing the disk 37 from the control of the balance-lever 90, and permitting the said disk to be retracted as before. When a thread remains on the hook 47, the front edge of the dog 64 bears on said thread at a point above the hook and above the lever 79, so that the thread is rigidly supported, and the proper retention of the lever by said thread is insured.

It will be evident that in the event of more than two threads being caught by the hook 47 there will be a cessation in the movement of the disk 37 until all of the threads have been disposed of by the hook 48.

The devices for disposing of the ends of the threads after they have been drawn through the reed are shown in Fig. 37.
In front of the reed is the guard-plate $r^4$, and in front of the latter is the arm $r'$, carried by the shaft R, which is continuously rotated by the mechanism fully described in the beginning of the specification. As the needle draws the thread through the reed, the rotating arm catches the thread and draws it to one side and over the curved top of the guard-plate $r^4$, by which it is prevented from falling back into the path of the needle as the latter again moves forward. As the arm carries the thread laterally, the free end of the thread is caught between the arm and the friction-plate $r^2$, and that portion of the thread between the arm and the reed is thus drawn taut, so as to insure the proper directing of the thread over the curved top of the guard-plate $r^4$ as the arm rotates.

In the former patents a rotating clearing-arm was shown, but without the guard-plate and friction-plate, which form novel elements of this portion of the present machine.

As the carriage on which are supported the working parts of the present machine is traversed uninterruptedly across the frame, the machine is quicker in action than a machine in which the carriage is moved intermittently, the operation being also effected without shock or jar, thus materially lessening the wear on many of the parts.

It will be evident to those skilled in the art to which my invention relates that various modifications in the minor details of the device may be made without affecting the working of these parts or departing from the invention; and I wish it to be understood that so far as mere operating devices are concerned—such, for instance, as power-transmitting gearing, levers, weights, or springs—any different but equivalent construction and arrangement which would be suggested by mere mechanical skill and judgment is within the scope of my invention.

I claim as my invention—

1. The combination, in a warp-drawing machine, of the frame, the carriage, and means for imparting an uninterrupted movement to said carriage, with a drawing-needle and its operating mechanism, and heddle-separating devices, both supported by and moving with said carriage, all substantially as specified.

2. The combination, in a warp-drawing machine, of the frame, the carriage, and means for uninterruptedly traversing said carriage on the frame, with the drawing-needle and its operating mechanism, heddle-separating devices, and warp-thread-selecting mechanism, all supported by and moving with the carriage, all substantially as set forth.

3. The combination of a drawing-needle, consisting of a flat flexible strip, with reciprocating mechanism and a guide-casing partly segmental and partly straight, and with deflectors, whereby the needle is turned on edge as it passes from the segmental to the straight portion of the casing, all substantially as specified.

4. The combination of a flexible needle and a guide-casing therefor with reciprocating mechanism comprising a continuous rack consisting of opposite segments with curved end connections, a pinion gearing into said rack, means for rotating said pinion, and a connection whereby the traversing movement of the pinion is imparted to the needle, all substantially as specified.

5. The combination of a flexible needle and a guide-casing therefor with a continuous rack comprising opposite segments with curved end connections, a pinion gearing into said rack, means for rotating said pinion, segmental guide-grooves, and a connection whereby the traversing movement of the pinion is imparted to the needle, all substantially as specified.

6. The combination of a flexible needle and a guide-casing therefor, a continuous rack comprising opposite segments with curved end connections, a pinion gearing into said rack, a pinion-shaft, a link connecting said shaft to the needle, and means for rotating the shaft, all substantially as specified.

7. The combination of the flexible needle and its guide-casing, the continuous rack comprising opposite segments with curved end connections, a pinion gearing into said rack, a pinion-shaft connected to the needle, a pivoted frame forming a bearing for said shaft, a driving-shaft having a bevel-wheel, a bevel-pinion gearing into said wheel and having a slotted hub, and a disk having a rib engaging with said slot, so as to form a clutch for driving the pinion-shaft, all substantially as specified.

8. The combination of the flexible needle, the guide-casing, the continuous rack comprising opposite segments and curved end connections, the pinion gearing into said rack, the pinion-shaft connected to the needle, an axial driving-shaft, and gearing whereby the movement of the same is transmitted to the pinion-shaft, a pivoted frame carrying said pinion-shaft, and a block carrying said frame and free to swing around the axial driving shaft, all substantially as specified.

9. The combination of a heddle-frame supporter with an eye-separating shuttle, guides whereby the shuttle is directed in a course at right angles to the length of the heddle, and mechanism for reciprocating said shuttle, all substantially as specified.

10. The combination of the heddle-frame supporter, the eye-separating shuttle, guides and reciprocating devices for said shuttle, and a cord connected to the shuttle and passing between the heddle-cords, whereby the heddle-eyes are separated into two parallel rows, all substantially as set forth.

11. The combination of the heddle-frame supporter, the eye-separating shuttle, guides and reciprocating devices for said shuttle, the cord for separating the heddle-eyes into rows, and a pivoted arm, whereby said cord is connected to the shuttle, all substantially as set forth.

12. The combination of the heddle-frame supporter, the eye-separating shuttle, guides and reciprocating devices for said shuttle, a clamping-finger, between which and the shuttle the heddle-eyes are held, and means for vibrating said finger, all substantially as set forth.

13. The combination of the heddle-frame supporter, the eye-separating shuttle, guides and reciprocating devices for said shuttle, a clamping-finger, between which and the shuttle the heddle-eyes are held, and means for retracting and advancing said finger, all substantially as set forth.

14. The combination of the heddle-frame supporter, the eye-separating shuttle, guides therefor, and a shuttle-reciprocating device comprising opposite pressing-fingers and means for vibrating them, all substantially as set forth.

15. The combination of the heddle-frame supporter, the eye-separating shuttle, guides therefor, opposite pressing-fingers acting on the shuttle, and means for vibrating the fingers, the distance between the points of the fingers being greater than the length of the shuttle, all substantially as specified.

16. The combination of the heddle-frame supporter, the eye-separating shuttle, guides therefor, the shuttle-operating fingers and their vibrating mechanism, and retaining-fingers moving with the shuttle-operating fingers and serving to hold back the heddle-eyes, all substantially as specified.

17. The combination of the heddle-frame supporter, the eye-separating shuttle, guides and reciprocating devices for said shuttle, and rods serving to guide the heddle-cords into the space between the shuttle-guides, all substantially as set forth.

18. The combination of a pair of nippers, a pair of carrying-levers connected for joint operation and slotted for the reception of the fulcrum-pins, a shaft having a crank-pin acting on one of said levers, and means for rotating said crank-shaft, all substantially as specified.

19. The combination of a drawing-needle, a thread-selecting hook, a carrier therefor, a laying-hook, whereby the thread is taken from the selecting-hook and placed on the needle, and means for operating the needle, laying-hook, and carrier, all substantially as specified.

20. The combination of a drawing-needle, a thread-selecting hook, a laying-hook, a selecting-hook carrier, to which said laying-hook is pivoted, and means for operating the needle, laying-hook, and carrier, all substantially as specified.

21. The combination of the drawing-needle, the selecting-hook having two faces at an angle to each other, the carrier for said hook, the laying-hook constructed to take up a thread at the angle of the two faces of the selecting-hook, and means for operating the needle, laying-hook, and carrier, all substantially as specified.

22. The combination of the drawing-needle, the selecting-hook and its carrier, the laying-hook, a yielding tension arm or lever, against which the thread is pressed by said laying-hook, and means for operating the needle, laying-hook, and carrier, all substantially as set forth.

23. The combination of warp-thread-selecting devices, guides whereby the threads are fed thereto in a single line, a pivoted dog having a nose constructed for deflection by a selected thread, and means, substantially as described, for restoring the dog to its normal position after deflection, all substantially as set forth.

24. The combination of the drawing-needle, the selecting-hook and its carrier, the laying-hook and its actuating mechanism, means for imparting a positive movement to the carrier in one direction, a spring for imparting the return movement, a lock for restraining the carrier when it has reached the limit of its forward movement, and an arm acted upon by the thread on the selecting-hook and engaging with the lock for the carrier, all substantially as specified.

25. The combination of the drawing-needle, a shaft having a clearing-finger, whereby the thread is caught after being drawn through the reed, a guard-plate over which the thread is passed by said clearing-finger, and means for operating the needle and rotating the finger-shaft, all substantially as specified.

26. The combination of the drawing-needle, a shaft having a clearing-finger, a guard-plate, over which the thread is passed by said finger, a friction-plate, whereby tension is imparted to the thread, and means for operating the needle and rotating the finger-shaft, all substantially as specified.

27. The combination of the heddle-separating and thread-selecting devices of the machine, a main shaft, K, geared to the primary shaft of the thread-selecting mechanism, a sleeve carrying cams for operating the heddle-separating mechanism, and gearing for driving said sleeve at a less rate of speed than the main shaft, all substantially as specified.

In testimony whereof I have signed my name to this specification in the presence of two subscribing witnesses.

LEWIS P. SHERMAN.

Witnesses:
JOHN C. HURD,
ORIN Q. SHUPLEIGH.